(12) United States Patent
Kwon et al.

(10) Patent No.: US 9,829,079 B1
(45) Date of Patent: Nov. 28, 2017

(54) PLANETARY GEAR TRAIN OF AUTOMATIC TRANSMISSION FOR VEHICLES

(71) Applicant: HYUNDAI MOTOR COMPANY, Seoul (KR)

(72) Inventors: Hyun Sik Kwon, Seoul (KR); Seong Wook Hwang, Gunpo-si (KR); Ki Tae Kim, Incheon (KR); Wonmin Cho, Hwaseong-si (KR); Jae Chang Kook, Hwaseong-si (KR); Seongwook Ji, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/370,221

(22) Filed: Dec. 6, 2016

(30) Foreign Application Priority Data

Sep. 13, 2016 (KR) .................. 10-2016-0118079

(51) Int. Cl.
*F16H 3/66* (2006.01)
(52) U.S. Cl.
CPC ....... *F16H 3/66* (2013.01); *F16H 2200/0073* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| 2010/0190600 | A1* | 7/2010 | Phillips | F16H 3/66 475/275 |
| 2012/0083381 | A1* | 4/2012 | Wittkopp | F16H 3/663 475/275 |
| 2012/0196718 | A1* | 8/2012 | Hart | F16H 3/66 475/271 |
| 2013/0150201 | A1* | 6/2013 | Knox | F16H 3/66 475/276 |

* cited by examiner

*Primary Examiner* — Colby M Hansen
(74) *Attorney, Agent, or Firm* — Brinks Gilson & Lione

(57) ABSTRACT

Eleven forward speeds and one reverse speed are achieved by a planetary gear train of an automatic transmission for a vehicle. The planetary gear train includes: an input shaft, an output shaft, four planetary gear sets respectively having three rotational elements, and six control elements for selectively interconnecting the rotational elements and a transmission housing. In particular, the six control elements may be four clutches and two brakes, and the rotational elements of each planetary gear set may be a sun gear, a planet carrier rotatably supporting pinion gears, and a ring gear which internally meshes with the pinion gears.

10 Claims, 2 Drawing Sheets

FIG. 2

Figure 1:
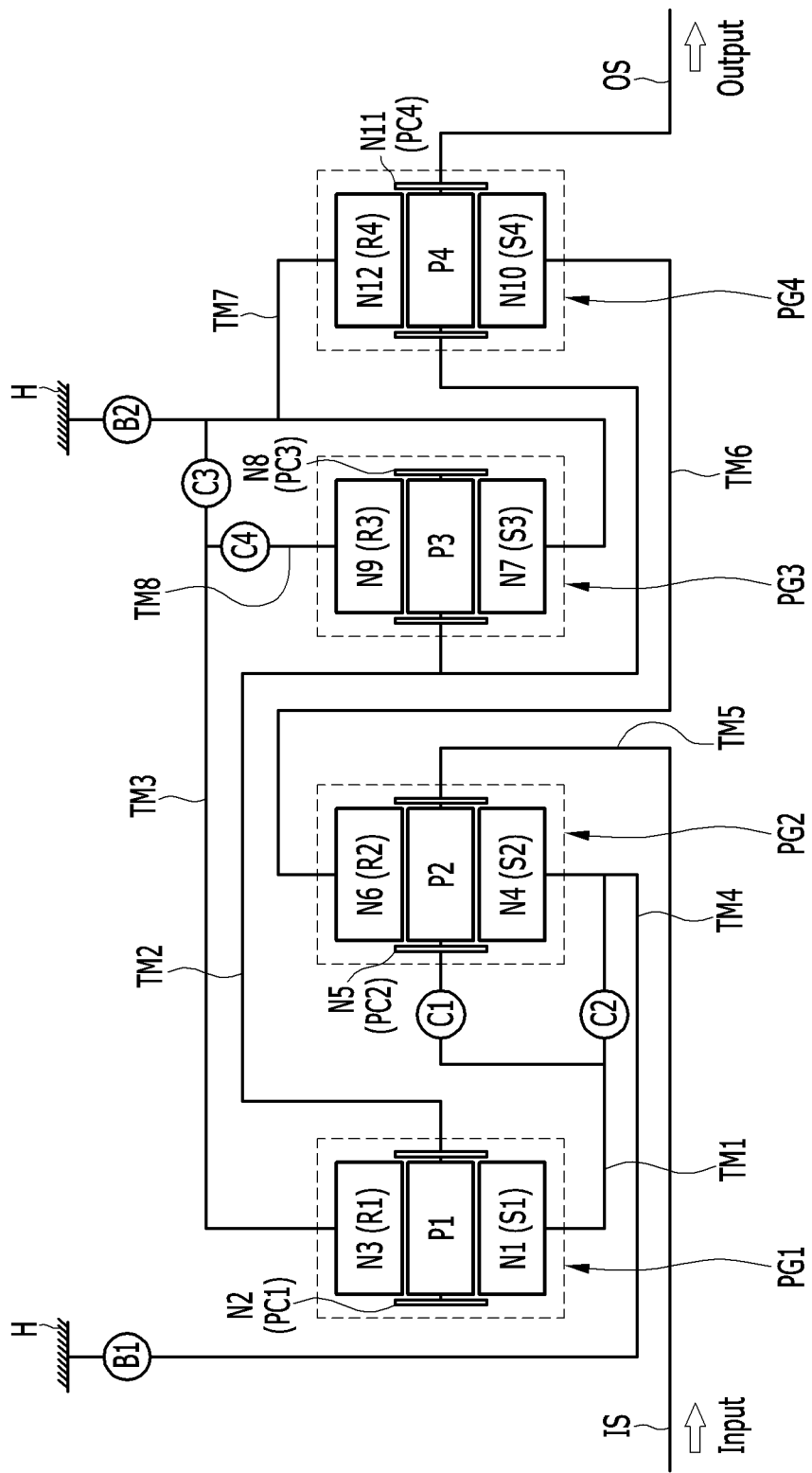

| Shift-stage | Control element | | | | | | Gear ratio |
|---|---|---|---|---|---|---|---|
| | C1 | C2 | C3 | C4 | B1 | B2 | |
| D1 | ● | | ● | | | ● | 5.000 |
| D2 | | ● | ● | | | ● | 3.374 |
| D3 | ● | ● | | | | ● | 2.600 |
| D4 | | ● | | | ● | ● | 1.761 |
| D5 | | ● | | ● | | ● | 1.325 |
| D6 | ● | ● | | ● | ● | | 1.138 |
| D7 | ● | ● | | ● | | | 1.000 |
| D8 | | | ● | ● | ● | | 0.779 |
| D9 | ● | | ● | ● | ● | | 0.677 |
| D10 | ● | | ● | | ● | | 0.558 |
| D11 | | ● | ● | | ● | | 0.406 |
| REV | ● | | | ● | | ● | -1.353 |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2016-0118079, filed on Sep. 13, 2016, the entire contents of which are incorporated herein by reference.

FIELD

The present disclosure relates to a planetary gear train of an automatic transmission for a vehicle.

BACKGROUND

The statements in this section merely provide background information related to the present disclosure and may not constitute prior art.

In the field of an automatic transmission, more multiplicity of shift-stages is used to enhance fuel efficiency and drivability of a vehicle. The increase of oil price is triggering a hard competition in enhancing fuel efficiency of a vehicle.

The engine downsizing has been attempted for the purpose of weight reduction and fuel efficiency. Simultaneously, the development of more shift stages of an automatic transmission has been conducted to provide better drivability and fuel efficiency.

In order to achieve more shift-stages of an automatic transmission, the number of parts is typically increased, which may affect installability, production cost, weight and/or power flow efficiency.

An automatic transmission of eight or more shift-stages typically includes three to four planetary gear sets and five to seven control elements (frictional elements), and this causes a lengthy transmission, thereby deteriorating installability.

In this regard, disposing planetary gear sets in parallel or employing dog clutches instead of wet-type control elements has been considered. However, such an arrangement may not be widely applicable, and using dog clutches may easily undermine shift-feel.

The above information disclosed in this Background section is only for enhancement of understanding of the background of the present disclosure and therefore it may contain information that does not form the prior art that is already known in this country to a person of ordinary skill in the art.

SUMMARY

The present disclosure provides a planetary gear train of an automatic transmission for a vehicle providing eleven forward speeds and one reverse speed by less number of parts, thereby improving power delivery performance and fuel efficiency through multi-stages of an automatic transmission, and improving driving stability of a vehicle by utilizing a low rotation speed of an engine.

A planetary gear train in one form of the present disclosure includes: an input shaft configured to receive an engine torque; an output shaft configured to output a shifted torque; a first planetary gear set having first, second, and third rotational elements; a second planetary gear set having fourth, fifth, and sixth rotational elements; a third planetary gear set having seventh, eighth, and ninth rotational elements; a fourth planetary gear set having tenth, eleventh, and twelfth rotational elements; a first shaft connected to the first rotational element; a second shaft connected to the second rotational element, the eighth rotational element, the eleventh rotational element, and the output shaft; a third shaft connected to the third rotational element; a fourth shaft connected to the fourth rotational element and configured to be selectively connected to the first shaft; a fifth shaft connected to the fifth rotational element and the input shaft, and configured to be selectively connected to the first shaft; a sixth shaft connected to the sixth rotational element and the tenth rotational element; a seventh shaft connected to the seventh rotational element and the twelfth rotational element, and configured to be selectively connected to the third shaft, and an eighth shaft connected to the ninth rotational element, and configured to be selectively connected to the third shaft.

The fourth shaft and the seventh shaft may be selectively connected to a transmission housing, respectively.

The first, second, and third rotational elements of the first planetary gear set may be respectively a first sun gear, a first planet carrier, and a first ring gear of the first planetary gear set. The fourth, fifth, and sixth rotational elements of the second planetary gear set may be respectively a second sun gear, a second planet carrier, and a second ring gear of the second planetary gear set. The seventh, eighth, and ninth rotational elements of the third planetary gear set may be respectively a third sun gear, a third planet carrier, and a third ring gear of the third planetary gear set. The tenth, eleventh, and twelfth rotational elements of the fourth planetary gear set may be respectively a fourth sun gear, a fourth planet carrier, and a fourth ring gear of the fourth planetary gear set.

The first, second, third, and fourth planetary gear sets may be arranged in an order the first, second, third, and fourth planetary gear sets from an engine side.

A planetary gear train in one exemplary form of the present disclosure may further include: a first clutch configured to selectively connect the first shaft and the fifth shaft; a second clutch configured to selectively connect the first shaft and the fourth shaft; a third clutch configured to selectively connect the third shaft and the seventh shaft; a fourth clutch configured to selectively connect the third shaft and the eighth shaft; a first brake configured to selectively connect the fourth shaft and the transmission housing; and a second brake configured to selectively connect the seventh shaft and the transmission housing.

The planetary gear train may realize at least eleven forward speeds and at least one reverse speed by operating the four planetary gear sets (e.g, four simple planetary gear sets) by controlling six control elements.

The planetary gear train may substantially improve driving stability by providing appropriate a shift-stage based on rotation speed of an engine by the multi-stage automatic transmission.

In addition, the planetary gear train enhances engine driving efficiency by multi-stages of an automatic transmission, and may improve power delivery performance and fuel efficiency.

Further, effects that can be obtained or expected from exemplary forms of the present disclosure are directly or suggestively described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a schematic diagram of a planetary gear train in one form of the present disclosure; and FIG. 2 is an operational chart for respective control elements at respective shift-stages in a planetary gear train in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, dividing names of components into a first, a second and the like is to divide the names because the names of the components are the same as each other but an order the components is not particularly limited.

FIG. 1 is a schematic diagram of a planetary gear train in one form of the present disclosure.

Referring to FIG. 1, a planetary gear train includes: first, second, third, and fourth planetary gear sets PG1, PG2, PG3, and PG4 arranged on a same axis; input shaft IS; output shaft OS; eight shafts TM1 to TM8 connected with rotational elements of the first, second, third, and fourth planetary gear sets PG1, PG2, PG3, and PG4; four clutches C1 to C4 and two brakes B1 and B2 (i.e., control elements); and a transmission housing H.

Torque input from the input shaft IS is shifted by cooperative operation of the first, second, third, and fourth planetary gear sets PG1, PG2, PG3, and PG4, and then the torque is output through the output shaft OS.

The planetary gear sets are named as first, second, third, and fourth planetary gear sets PG1, PG2, PG3, and PG4, based on the order of their arrangement from an engine side.

The input shaft IS is an input member. The torque from a crankshaft of an engine is converted through a torque converter and delivered to the input shaft IS.

The output shaft OS is an output member and arranged on a same axis with the input shaft IS. The output shaft OS delivers the shifted driving torque to a drive shaft through a differential apparatus (not shown).

In one form, the first planetary gear set PG1 is a single pinion planetary gear set and includes: a first sun gear S1; a first planet carrier PC1 that rotatably supports a plurality of first pinion gears P1 externally gear-meshed with the first sun gear S1; and a first ring gear R1 that is internally gear-meshed with the plurality of first pinion gears P1. The first sun gear S1 acts as a first rotational element N1, the first planet carrier PC1 acts as a second rotational element N2, and the first ring gear R1 acts as a third rotational element N3.

The second planetary gear set PG2 may be a single pinion planetary gear set and includes: a second sun gear S2; a second planet carrier PC2 that rotatably supports a plurality of second pinion gears P2 externally gear-meshed with the second sun gear S2; and a second ring gear R2 that is internally gear-meshed with the plurality of second pinion gears P2. The second sun gear S2 acts as a fourth rotational element N4, the second planet carrier PC2 acts as a fifth rotational element N5, and the second ring gear R2 acts as a sixth rotational element N6.

The third planetary gear set PG3 may be a single pinion planetary gear set and includes: a third sun gear S3; a third planet carrier PC3 that rotatably supports a plurality of third pinion gears P3 externally gear-meshed with the third sun gear S3; and a third ring gear R3 that is internally gear-meshed with the plurality of third pinion gears P3. The third sun gear S3 acts as a seventh rotational element N7, the third planet carrier PC3 acts as an eighth rotational element N8, and the third ring gear R3 acts as a ninth rotational element N9.

The fourth planetary gear set PG4 may be a single pinion planetary gear set and includes: a fourth sun gear S4; a fourth planet carrier PC4 that rotatably supports a plurality of fourth pinion gears P4 externally gear-meshed with the fourth sun gear S4; and a fourth ring gear R4 that is internally gear-meshed with the plurality of fourth pinion gears P4. The fourth sun gear S4 acts as a tenth rotational element N10, the fourth planet carrier PC4 acts as an eleventh rotational element N11, and the fourth ring gear R4 acts as a twelfth rotational element N12

In the arrangement of the first, second, third, and fourth planetary gear sets (i.e., PG1, PG2, PG3, and PG4), the second rotational element N2, the eighth rotational element N8, and the eleventh rotational element N11 are directly interconnected, the sixth rotational element N6 and the tenth rotational element N10 are directly interconnected, and the seventh rotational element N7 and the twelfth rotational element N12 are directly interconnected, by eight shafts TM1 to TM8.

The eight shafts TM1 to TM8 are arranged as follows.

Each of the eight shafts TM1 to TM8 may be a rotational member that interconnects the input and output shafts and rotational elements of the planetary gear sets PG1, PG2, PG3, and PG4, or may be a rotational member that selectively interconnects a rotational element to the transmission housing H, or may be a fixed member fixed to the transmission housing H.

The first shaft TM1 is directly connected to the first rotational element N1 (first sun gear S1).

The second shaft TM2 is directly connected to the second rotational element N2 (first planet carrier PC1), the eighth rotational element N8 (third planet carrier PC3), the eleventh rotational element N11 (fourth planet carrier PC4) and the output shaft OS, by which the second shaft TM2 acts as an output element.

The third shaft TM3 is directly connected to the third rotational element N3 (first ring gear R1).

The fourth shaft TM4 is directly connected to the fourth rotational element N4 (second sun gear S2), and selectively connected to the first shaft TM1 and the transmission housing H, by which the fourth shaft TM4 selectively acts as a fixed element.

The fifth shaft TM5 is directly connected to the fifth rotational element N5 (second planet carrier PC2) and the input shaft IS, and is selectively connected to the first shaft TM1, by which the firth shaft TM5 acts as an input element.

The sixth shaft TM6 is directly connected to the sixth rotational element N6 (second ring gear R2) and the tenth rotational element N10 (fourth sun gear S4).

The seventh shaft TM7 is directly connected to the seventh rotational element N7 (third sun gear S3) and the twelfth rotational element N12 (fourth ring gear R4), and the seventh shaft TM7 is selectively connected to the third shaft TM3 and the transmission housing H so that the seventh shaft TM7 selectively acts as a fixed element.

The eighth shaft TM8 is directly connected to the ninth rotational element N9 (third ring gear R3), and selectively connected to the third shaft TM3.

The eight shafts TM1 to TM8, the input shaft IS, and the output shaft OS may be selectively interconnected with one another by control elements of four clutches C1, C2, C3, and C4.

The eight shafts TM1 to TM8 may be selectively connected to the transmission housing H, by control elements of two brakes B1 and B2.

The four clutches C1 to C4 and the two brakes B1 and B2 are arranged as follows.

The first clutch C1 is arranged between the first shaft TM1 and the fifth shaft TM5, and selectively connects the first shaft TM1 and the fifth shaft TM5, thereby controlling power delivery therebetween.

The second clutch C2 is arranged between the first shaft TM1 and the fourth shaft TM4, and selectively connects the first shaft TM1 and the fourth shaft TM4, thereby controlling power delivery therebetween.

The third clutch C3 is arranged between the third shaft TM3 and the seventh shaft TM7, and selectively connects the third shaft TM3 and the seventh shaft TM7, thereby controlling power delivery therebetween.

The fourth clutch C4 is arranged between the third shaft TM3 and the eighth shaft TM8, and selectively connects the third shaft TM3 and the eighth shaft TM8, thereby controlling power delivery therebetween.

The first brake B1 is arranged between the fourth shaft TM4 and the transmission housing H, and selectively connects the fourth shaft TM4 to the transmission housing H.

The second brake B2 is arranged between the seventh shaft TM7 and the transmission housing H, and selectively connects the seventh shaft TM7 to the transmission housing H.

The control elements of the first, second, third and fourth clutches (i.e., C1, C2, C3, C4) and the first and second brakes (i.e., B1, B2) may be in the form of multi-plate hydraulic pressure friction devices that are frictionally engaged by hydraulic pressure.

FIG. 2 is an operational chart for respective control elements at respective shift-stages in a planetary gear train in one form of the present disclosure.

Referring to FIG. 2, a planetary gear train provides eleven forward speeds and one reverse speed by operating three control elements among the first, second, third, and fourth clutches C1, C2, C3, and C4 and the first and second brakes B1 and B2 at respective shift-stages.

In the forward first speed D1, the first and third clutches C1 and C3 and the second brake B2 are simultaneously operated.

As a result, the first shaft TM1 is connected to the fifth shaft TM5 by the operation of the first clutch C1, and the third shaft TM3 is connected to the seventh shaft TM7 by the operation of the third clutch C3. In this state, the torque of the input shaft IS is input to the fifth shaft TM5 and the first shaft TM1.

In addition, the seventh shaft TM7 acts as a fixed element by the operation of the second brake B2, thereby performing the forward first speed by cooperative operation of respective shafts. A shifted torque is delivered to the output shaft OS which is connected with the second shaft TM2.

In the forward second speed D2, the second and third clutches C2 and C3 and the second brake B2 are simultaneously operated.

As a result, the first shaft TM1 is connected to the fourth shaft TM4 by the operation of the second clutch C2, and the third shaft TM3 is connected to the seventh shaft TM7 by the operation of the third clutch C3. In this state, the torque of the input shaft IS is input to the fifth shaft TM5.

In addition, the seventh shaft TM7 acts as a fixed element by the operation of the second brake B2, thereby performing the forward second speed by cooperative operation of respective shafts. A shifted torque is delivered to the output shaft OS which is connected with the second shaft TM2.

In the forward third speed D3, the first and second clutch C1 and C2 and the second brake B2 are simultaneously operated.

As a result, the first shaft TM1 is connected to the fifth shaft TM5 by the operation of the first clutch C1, and the first shaft TM1 is connected to the fourth shaft TM4 by the operation of the second clutch C2. In this state, the torque of the input shaft IS is input to the fifth shaft TM5 and the first shaft TM1.

In addition, the seventh shaft TM7 acts as a fixed element by the operation of the second brake B2, thereby realizing the forward third speed by cooperative operation of respective shafts. A shifted torque is delivered to the output shaft OS which is connected with the second shaft TM2.

In the forward fourth speed D4, the second clutch C2 and the first and second brakes B1 and B2 are simultaneously operated.

As a result, the first shaft TM1 is connected to the fourth shaft TM4 by the operation of the second clutch C2. In this state, the torque of the input shaft IS is input to the fifth shaft TM5.

In addition, the fourth shaft TM4 and the seventh shaft TM7 act as fixed elements by the operation of the first and second brakes B1 and B2. Thereby the forward fourth speed is performed by cooperative operation of respective shafts and a shifted torque is output to the output shaft OS which is connected with the second shaft TM2.

In the forward fifth speed D5, the second and fourth clutches C2 and C4 and the second brake B2 are simultaneously operated.

As a result, the first shaft TM1 is connected to the fourth shaft TM4 by the operation of the second clutch C2, and the third shaft TM3 is connected to the eighth shaft TM8 by the operation of the fourth clutch C4. In this state, the torque of the input shaft IS is input to the fifth shaft TM5.

In addition, the seventh shaft TM7 acts as a fixed element by the operation of the second brake B2, thereby realizing the forward fifth speed by cooperative operation of respective shafts, outputting a shifted torque to the output shaft OS which is connected with the second shaft TM2.

In the forward sixth speed D6, the second and fourth clutches C2 and C4 and the first brake B1 are simultaneously operated.

As a result, the first shaft TM1 is connected to the fourth shaft TM4 by the operation of the second clutch C2, and the third shaft TM3 is connected to the eighth shaft TM8 by the operation of the fourth clutch C4. In this state, the torque of the input shaft IS is input to the fifth shaft TM5.

In addition, the fourth shaft TM4 acts as a fixed element by the operation of the first brake B1, thereby performing the forward sixth speed by cooperative operation of respective shafts. A shifted torque is delivered to the output shaft OS which is connected with the second shaft TM2.

In the forward seventh speed D7, the first, second, and fourth clutches C1, C2, and C4 are simultaneously operated.

As a result, the first shaft TM1 is connected to the fifth shaft TM5 by the operation of the first clutch C1, the first shaft TM1 is connected to the fourth shaft TM4 by the operation of the second clutch C2, and the third shaft TM3 is connected to the eighth shaft TM8 by the operation of the fourth clutch C4. In this state, the torque of the input shaft IS is input to the fifth shaft TM5 and the first shaft TM1.

In this case, while the first, second, third, and fourth planetary gear sets PG1, PG2, PG3, and PG4 integrally rotate, a torque is outputted as the torque is inputted, thereby forming the forward seventh speed and outputting a shifted torque to the output shaft OS which is directly connected with the second shaft TM2.

In the forward eighth speed D8, the first and fourth clutches C1 and C4 and the first brake B1 are simultaneously operated.

As a result, the first shaft TM1 is connected with the fifth shaft TM5 by the operation of the first clutch C1, and the third shaft TM3 is connected with the eighth shaft TM8 by the operation of the fourth clutch C4. In this state, the torque of the input shaft IS is input to the fifth shaft TM5 and the first shaft TM1.

In addition, the fourth shaft TM4 acts as a fixed element by the operation of the first brake B1, thereby realizing the forward eighth speed, which is an overdrive gear, by cooperative operation of respective shafts and outputting a shifted torque to the output shaft OS connected with the second shaft TM2.

In the forward ninth speed D9, the third and fourth clutches C3 and C4 and the first brake B1 are simultaneously operated.

As a result, the third shaft TM3 is connected to the seventh shaft TM7 by the operation of the third clutch C3, and the third shaft TM3 is connected to the eighth shaft TM8 by the operation of the fourth clutch C4. In this state, the torque of the input shaft IS is input to the fifth shaft TM5.

In addition, the fourth shaft TM4 acts as a fixed element by the operation of the first brake B1, thereby performing the forward ninth speed, which is an overdrive gear, by cooperative operation of respective shafts and outputting a shifted torque to the output shaft OS which is connected with the second shaft TM2.

In the forward tenth speed D10, the first and third clutches C1 and C3 and the first brake B1 are simultaneously operated.

As a result, the first shaft TM1 is connected to the fifth shaft TM5 by the operation of the first clutch C1, and the third shaft TM3 is connected to the seventh shaft TM7 by the operation of the third clutch C3. In this state, the torque of the input shaft IS is become input to the fifth shaft TM5 and the first shaft TM1.

In addition, the fourth shaft TM4 acts as a fixed element by the operation of the first brake B1, thereby providing the forward tenth speed, which is an overdrive gear, by cooperative operation of respective shafts and outputting a shifted torque to the output shaft OS which is connected with the second shaft TM2.

In the forward eleventh speed D11, the second and third clutches C2 and C3 and the first brake B1 are simultaneously operated.

As a result, the first shaft TM1 is connected to the fourth shaft TM4 by the operation of the second clutch C2, and the third shaft TM3 is connected to the seventh shaft TM7 by the operation of the third clutch C3. In this state, the torque of the input shaft IS is input to the fifth shaft TM5.

In addition, the fourth shaft TM4 acts as a fixed element by the operation of the first brake B1, thereby providing the forward eleventh speed, which is a highest gear, by cooperative operation of respective shafts and outputting a shifted torque to the output shaft OS which is connected with the second shaft TM2.

In the reverse speed REV, the first and fourth clutches C1 and C4 and the second brake B2 are simultaneously operated.

As a result, the first shaft TM1 is connected to the fifth shaft TM5 by the operation of the first clutch C1, and the third shaft TM3 is connected to the eighth shaft TM8 by the operation of the fourth clutch C4. In this state, the torque of the input shaft IS is become input to the fifth shaft TM5.

In addition, the seventh shaft TM7 acts as a fixed element by the operation of the second brake B2, thereby performing the reverse speed by cooperative operation of respective shafts and outputting a shifted torque to the output shaft OS which is connected with the second shaft TM2.

As described above, a planetary gear train in one form of the present disclosure may provide the forward eleven speeds and one reverse speed by operating four planetary gear sets PG1, PG2, PG3, and PG4 by controlling four clutches C1, C2, C3, and C4 and two brakes B1 and B2.

In addition, a planetary gear train in one form of the present disclosure may provide shift stages appropriately adjusted to rotation speed of an engine through multi-stages of an automatic transmission and thereby improve driving stability of a vehicle by utilizing a low rotation speed of an engine.

In addition, a planetary gear train in one exemplary form of the present disclosure increases engine driving efficiency by multi-stages of an automatic transmission, and may improve power delivery performance and fuel consumption.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

B1, B2: first and second brakes
C1, C2, C3, C4: first, second, third, and fourth clutches
PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft
OS: output shaft
TM1, TM2, TM3, TM4, TM5, TM6, TM7, TM8: first, second, third, fourth, fifth, sixth, seventh, and eighth shafts

What is claimed is:

1. A planetary gear train of an automatic transmission for a vehicle, comprising:
   an input shaft configured to receive an engine torque;
   an output shaft configured to output a shifted torque;
   a first planetary gear set having first, second, and third rotational elements;
   a second planetary gear set having fourth, fifth, and sixth rotational elements;
   a third planetary gear set having seventh, eighth, and ninth rotational elements;
   a fourth planetary gear set having tenth, eleventh, and twelfth rotational elements;

a first shaft connected to the first rotational element;
a second shaft connected to the second rotational element, the eighth rotational element, the eleventh rotational element, and the output shaft;
a third shaft connected to the third rotational element;
a fourth shaft connected to the fourth rotational element and configured to be selectively connected to the first shaft;
a fifth shaft connected to the fifth rotational element and the input shaft, and configured to be selectively connected to the first shaft;
a sixth shaft connected to the sixth rotational element and the tenth rotational element;
a seventh shaft connected to the seventh rotational element and the twelfth rotational element, and configured to be selectively connected to the third shaft; and
an eighth shaft connected to the ninth rotational element, and configured to be selectively connected to the third shaft.

2. The planetary gear train of claim 1, wherein the fourth shaft and the seventh shaft are selectively connected to a transmission housing, respectively.

3. The planetary gear train of claim 2, further comprising:
a first clutch configured to selectively connect the first shaft and the fifth shaft;
a second clutch configured to selectively connect the first shaft and the fourth shaft;
a third clutch configured to selectively connect the third shaft and the seventh shaft;
a fourth clutch configured to selectively connect the third shaft and the eighth shaft;
a first brake configured to selectively connect the fourth shaft and the transmission housing; and
a second brake configured to selectively connect the seventh shaft and the transmission housing.

4. The planetary gear train of claim 1, wherein
the first, second, and third rotational elements of the first planetary gear set are respectively a first sun gear, a first planet carrier, and a first ring gear of the first planetary gear set;
the fourth, fifth, and sixth rotational elements of the second planetary gear set are respectively a second sun gear, a second planet carrier, and a second ring gear of the second planetary gear set;
the seventh, eighth, and ninth rotational elements of the third planetary gear set are respectively a third sun gear, a third planet carrier, and a third ring gear of the third planetary gear set; and
the tenth, eleventh, and twelfth rotational elements of the fourth planetary gear set are respectively a fourth sun gear, a fourth planet carrier, and a fourth ring gear of the fourth planetary gear set.

5. The planetary gear train of claim 1, wherein the first, second, third, and fourth planetary gear sets are arranged in an order the first, second, third, and fourth planetary gear sets from an engine side.

6. A planetary gear train of an automatic transmission for a vehicle, comprising:
an input shaft configured to receive an engine torque;
an output shaft configured to output a shifted torque;
a first planetary gear set having first, second, and third rotational elements;
a second planetary gear set having fourth, fifth, and sixth rotational elements;
a third planetary gear set having seventh, eighth, and ninth rotational elements; and
a fourth planetary gear set having tenth, eleventh, and twelfth rotational elements,
wherein the input shaft is connected to the fifth rotational element,
the output shaft is connected to the eleventh rotational element,
the second rotational element is connected to the eighth rotational element and the eleventh rotational element,
the sixth rotational element is connected to the tenth rotational element,
the seventh rotational element is connected to the twelfth rotational element,
the first rotational element is configured to be selectively connected to the fourth and fifth rotational elements, respectively, and
the third rotational element is configured to be selectively connected to the seventh and ninth rotational elements, respectively.

7. The planetary gear train of claim 6, wherein the fourth rotational element and the seventh rotational element are selectively connected to a transmission housing, respectively.

8. The planetary gear train of claim 7, further comprising:
a first clutch configured to selectively connect the first rotational element and the fifth rotational element;
a second clutch configured to selectively connect the first rotational element and the fourth rotational element;
a third clutch configured to selectively connect the third rotational element and the seventh rotational element;
a fourth clutch configured to selectively connect the third rotational element and the ninth rotational element;
a first brake configured to selectively connect the fourth rotational element and the transmission housing; and
a second brake configured to selectively connect the seventh rotational element and the transmission housing.

9. The planetary gear train of claim 6, wherein
the first, second, and third rotational elements of the first planetary gear set are respectively a first sun gear, a first planet carrier, and a first ring gear of the first planetary gear set;
the fourth, fifth, and sixth rotational elements of the second planetary gear set are respectively a second sun gear, a second planet carrier, and a second ring gear of the second planetary gear set;
the seventh, eighth, and ninth rotational elements of the third planetary gear set are respectively a third sun gear, a third planet carrier, and a third ring gear of the third planetary gear set; and
the tenth, eleventh, and twelfth rotational elements of the fourth planetary gear set are respectively a fourth sun gear, a fourth planet carrier, and a fourth ring gear of the fourth planetary gear set.

10. The planetary gear train of claim 6, wherein the first, second, third, and fourth planetary gear sets are arranged in an order of the first, second, third, and fourth planetary gear sets from an engine side.

* * * * *